United States Patent [19]

Schultz

[11] Patent Number: 4,472,472
[45] Date of Patent: Sep. 18, 1984

[54] PROTECTIVE DEVICE

[76] Inventor: Robert J. Schultz, 229 E. Hunting Ridge Rd., Stamford, Conn. 06903

[21] Appl. No.: 489,334

[22] Filed: Apr. 28, 1983

[51] Int. Cl.$^3$ ............................ B32B 3/22; A42B 3/00
[52] U.S. Cl. ......................................... 428/178; 2/410;
2/411; 2/412; 2/425; 5/448; 5/449; 428/166;
428/304.4
[58] Field of Search ..................... 428/178, 304.4, 166;
2/410, 411, 412, 425; 5/448, 449, 480, 481

[56] References Cited

U.S. PATENT DOCUMENTS

| | | | |
|---|---|---|---|
| 2,028,060 | 1/1936 | Gilbert | 5/449 |
| 4,307,471 | 12/1981 | Lovell | 2/411 |
| 4,432,099 | 2/1984 | Grick et al. | 2/412 |

FOREIGN PATENT DOCUMENTS

| | | | |
|---|---|---|---|
| 235033 | 8/1964 | Austria | 2/410 |
| 0048442 | 3/1982 | European Pat. Off. | 2/425 |
| 0047712 | 3/1982 | European Pat. Off. | 2/425 |

Primary Examiner—Paul J. Thibodeau
Attorney, Agent, or Firm—McAulay, Fields, Fisher, Goldstein & Nissen

[57] ABSTRACT

A protective device, such as a boxing helmet, rib or muscle protector, athletic mat, hockey helmet, motorcycle helmet and similar devices, is formed such that the major shock absorption is accomplished by a series of bowed, preferably plastic, members which flex when the device is subjected to an impact, so as to absorb the shock and dissipate its transmission to the user. Because of the nature of these bowed members, when the shock has been dissipated, the member returns to its original position so as to be able to absorb further shocks.

9 Claims, 7 Drawing Figures

PROTECTIVE DEVICE

BACKGROUND OF THE INVENTION

The use of protective devices in sports have long been known, particularly protective helmets. Thus, protective helmets have long been employed for football players and, more recently, have gained increasing acceptance in baseball, hockey, motorcycling and boxing. In some of these endeavors, in fact, the protective helmet has been mandated for participation in the sport. In each case, these devices are provided to absorb the dangerous shock experienced upon contact with another player, the projectile used in the sport, or the fist of the competitor.

Over the years, helmets of the type referred to have been subject to continuous improvement. For example, the original football helmet which was, essentially, a leather cap, has had additions involving strap supports, sponge-rubber padding, and other improvements. The other improvements, particularly as exemplified in baseball and hockey helmets, particularly with the development of more modern materials, have included the use of impact absorbent plastics, particularly for the outer layer of the helmet.

The problems of dissipating severe shocks is not, however, limited to the field of athletic helmets. For example, when engaging in certain indoor sports, such as wrestling, an athletic mat is used. Frequently, a competitor is thrown to this mat with great force. While the athletic mat is provided to absorb some of the shock of this force, frequently the mere padding found in such athletic mats is not sufficient to prevent severe injury.

Similarly, whether participating in athletic events, or otherwise engaged, it is frequently important to cushion certain parts of the body against the results of a shock force or impact. For example, when there has been a severe muscle bruise, fractured ribs or other broken bones, it is extremely important, particularly during the mending process, that the area involved be protected against severe shock.

While the sponge materials and strap supports of the prior art do provide some protection, improvement is both necessary and desirable.

SUMMARY OF THE INVENTION

In accordance with the present invention, it has unexpectedly been discovered that the employment of a series of bowed, resilient members, the members being connected along the apex of the bow, provide substantially improved shock absorbent properties. The connected series of resilient, bowed members form, in effect, an "arcade," and this arcade can be placed between two layers of material constituting an inner and an outer surface. When the outer surface is struck by a blow, much of the force of the blow is taken up by flexing of the arcade, so that the force transmitted to the outer layer is substantially reduced and dissipated before reaching the inner layer.

The series of resilient, bowed members are so connected as to leave spaces between individual members below the apex connection line. In employing the arcades thus formed, some space can be left between the legs of adjacent arcades, the legs can be abutting with respect to adjacent arcades or, if desired, though not preferred, the legs of adjacent arcades can be interdigitated, the legs of one arcade fitting into the spaces left in the adjacent arcade.

With a helmet of the type described as, for example, for football, hockey, baseball, motorcyling, and boxing, two layers can be provided, the inner layer being so formed as to allow placement against the head of the wearer, either directly or through means of strap supports well known in the art, while the outer layer can be of an impact resistant plastic material. The resilient, bowed arcades described in accordance with the present invention are placed in a space provided between the inner and outer layers. The surfaces of the inner and outer layers facing the space can be smooth or, if desired, can be provided with a foam material to provide additional shock absorption. With an athletic mat, the upper layer would generally be of fabric or non-abrasive plastic material, while the lower layer, adjacent the floor, could be formed of any desirable material, particularly one which would prevent sliding of the athletic mat during use. The resilient, bowed arcades of the present invention would then be placed between the upper and lower layers to provide the desired shock absorption. Again, the surfaces of the upper and lower layers of the mat facing the space could be smooth, or could be provided with a foam surface. Similar constructions would be employed for shock absorption protection over injured body members, such as muscles, ribs, and other bones.

DESCRIPTION OF THE PREFERRED EMBODIMENTS

Figure 1:
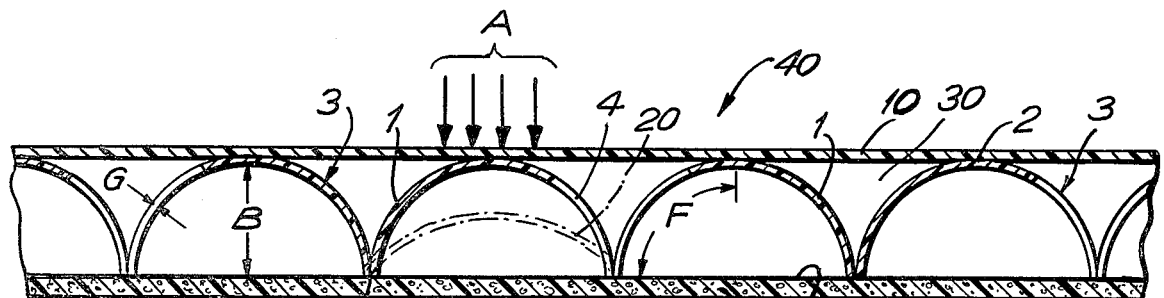
FIG. 1 is a cross-sectional view of a protective device in accordance with the present invention illustrating an upper layer and a lower layer, with the arcades of the present invention placed between the layers.
Figure 2:
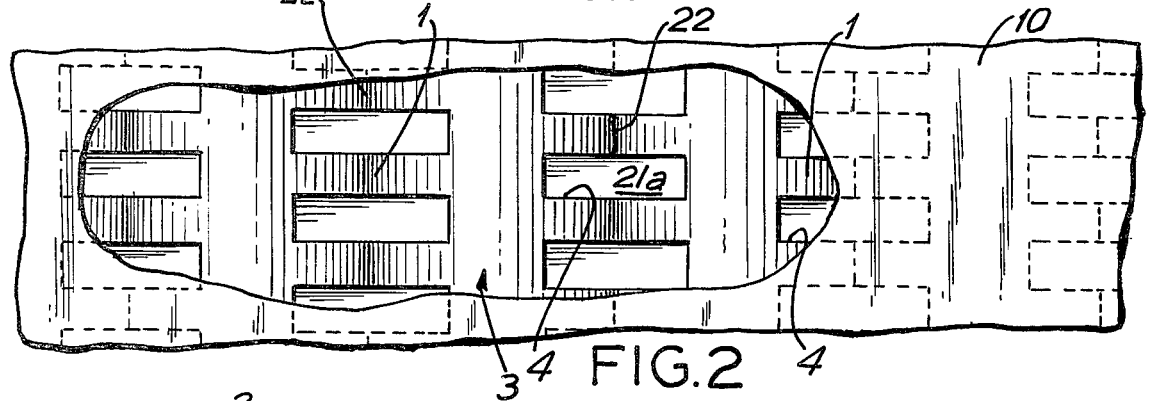
FIG. 2 is a plan view, partially broken away, of the structure illustrated in FIG. 1.
Figure 5:
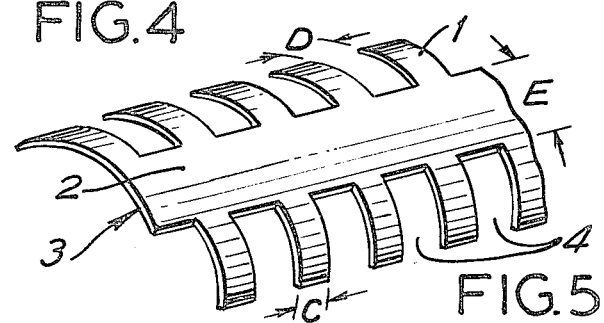
FIG. 5 is a perspective view of a portion of an arcade in accordance with the present invention.

In accordance with the present invention, and referring, particularly, to FIGS. 1, 2, and 5, an arcade is constructed from a series of flexible, resilient, plastic legs 1, best illustrated in FIG. 5. These resilient, flexible, plastic legs are curved, as illustrated, and are joined, at the apex 2 so as to form the arcade 3. As illustrated in FIG. 5, the legs 1 are offset with respect to each other, so that the legs 1 on one side are adjacent the spaces 4 on the opposite side of the arcade. However, this is not a requirement of the present invention, and the legs 1 on one side of the arcade can directly match the legs 1 on the opposite side of the arcade 3, as opposed to being offset. A series of these arcades 3 are placed, as illustrated in FIG. 1, between an outer layer 10 and an inner layer 11. When a force, as illustrated by arrows A is applied to the outer surface 10, they cause a flexing of the arcade 3, as indicated by the dotted lines 20. This absorbs a substantial portion of the force created at A before being transmitted to the inner surface 11. The inner surface 11 may be provided with a foam layer 21 to aiu in absorbing the shock transmitted through the force A. By contrast, the surface 21a of inner surface 11 may be a smooth, or polished, plastic surface. Such a surface aids in movement of the legs 1 of the arcade 3, so that more of the shock A is taken up by bending and flexing of the members of the arcade 3. Thus, as indicated, and as shown by the position indicated by the dotted line portion 20 of FIG. 1, the arcade is not affixed to the upper or lower surfaces 10 or 11, but is free to move within the space 30 formed between the layers 10 and 11. Thus, the arcades are free floating.

The outer and inner shells 10 and 11, as illustrated particularly in FIG. 1, may be fabricated from the same or from different polymers. Examples of polymers which can be employed for either or both of these layers include poly-alpha-olefins, for example, polypropylene, homopolymers of ethylene and other alpha-olefins, such as butene-1 and vinyl acetate, and mixtures thereof; polyamides, especially polyhexamethylene adipamide, and blends thereof with a compatible elastomeric or rubber material; polycarbonates; acrylonitrile/butadiene/styrene polymers; polyvinyl chloride; cellulose acetobutyrate; polybutylene terephthalate; polyoxymethylene polymers; polyester or epoxy polymers reinforced with glass or KEVLAR, a trademark of E. I. duPont deNemours & Company for aramid fibers, acrylics, and the like. Generally, for reasons of cost, particularly, though performance is at least acceptable, the thermoplastic resins of the vinyl type, particularly the polyethylenes, are desired. The sponger layer 21, if it is included, may be any of those normally employed in constructions of this general type.

As illustrated in FIG. 2, the arcades 3 of the present invention are abutted against each other, as along the lines 22. Flexing of an arcade 3, in accordance with the structure of FIGS. 1 and 2, encounters the resistance of the adjacent arcade 3, thus increasing the stiffness and resiliency displayed by a given arcade in resisting the forces A applied to the outer surface 10.

Figure 3:
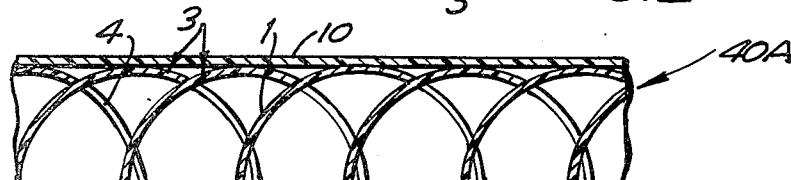
FIG. 3 is a view similar to FIG. 1, with the arcades being interdigitated.
Figure 4:
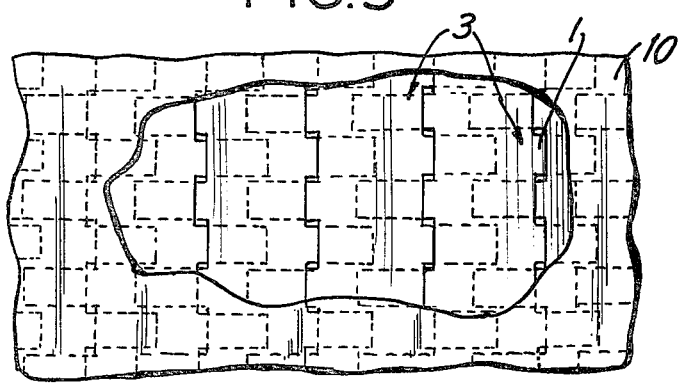
FIG. 4 is a view similar to FIG. 2 with the arcades being interdigitated.

As illustrated in FIGS. 3 and 4, the arcades 3, as particularly illustrated in FIG. 5, may be interdigitated. In this type of construction, the legs 1 of one arcade 3 fit within the spaces 4 provided in an adjacent arcade. While the resistance of the adjacent arcade to bending, as shown in FIG. 1, is obviously not present, there are more arcades to take up the effect of a given force A applied. However, there is obviously an additional cost to providing the further number of arcades required by the construction of FIGS. 3 and 4. Further, as indicated, adjacent arcades do not provide the further resistance which is realized by the abutting of the arcades in FIGS. 1 and 2. For that reason, the construction of FIGS. 1 and 2 is preferred over that of FIGS. 3 and 4.

The structures shown in the first embodiment of FIGS. 1 and 2, and in the second embodiment of FIGS. 3 and 4, have been described with only an outer layer 10 and an inner layer 11. An optional soft, foamed plastic layer 21 is shown on 11, though an optional foamed layer may also be provided on that portion of outer layer 10 which faces the space 30 formed between the outer layers 10 and 11. In either event, this optional foamed layer can be provided to aid in taking up shock applied to the outer layer 10.

As shown in the first embodiment of FIGS. 1 and 2, and in the second embodiment of FIGS. 3 and 4, the invention comprises the outer layer 10 and inner layer 11, with a series of arcades 3 formed of bowed, resilient plastic legs joined at the apex. The shock absorbing structure thus created is not limited to a particular form. As indicated in the introduction, this structure can be provided for helmets employed in various sports, such as boxing, football, hockey, baseball, motorcycling, etc. It may also be employed with regard to athletic mats, as indicated. Additionally, other devices where shock absorption is desirable as, for example, padded dashboards, etc., can also be employed with the arcade shock absorbers of the present invention.

While not meant to be limiting, a particular size arcade 3 has been found particularly effective when forming athletic helmets of the kind described. Referring, particularly, to FIGS. 1 and 5, the height of the arcade B should be from about 7/16 to ⅝ inch, the width of each leg 1, C should be about 5/16 to ½ inch, the space D between the legs should be approximately 9/16 to ¾ inch, the apex portion 2 should have a width E of approximately ¾ inch to 1 inch, and the surface distance F from the end of the leg 1 to the center of the apex 2 should be approximately 2 inches. An adequate thickness of material, particularly when using polyethylene, for the entire arcade structure, as illustrated at G, is between 1/64 and 1/16 inch.

Figure 6:
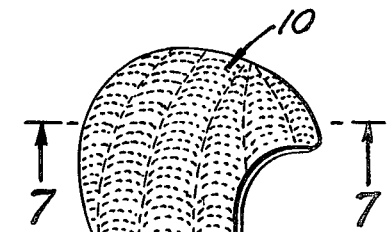
FIG. 6 is a perspective view of a portion of a helmet constructed with arcades in accordance with the present invention.
Figure 7:
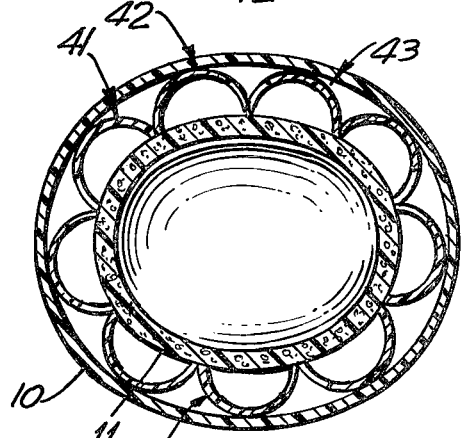
FIG. 7 is a cross-section of the helmet of FIG. 6, taken along the line 7—7 of FIG. 6.

If the structure is to be employed in an athletic helmet, then the inner layer 10 and the outer layer 11 must be shaped into a helmet form. Such a form is illustrated in FIG. 6 where a series of the structures 40 of FIG. 1 or 40A of FIG. 3 are shaped to conform to a head. As shown in FIG. 6, rows 41, 42, 43, etc. of these structures are provided, generally following the contour of the head to be protected. The internal structure of each of these rows is illustrated in the cross-section of FIG. 7. As particularly illustrated in FIG. 7, the structure is equivalent to that of FIGS. 1 and 2, though it will, of course, be recognized that the structure of FIGS. 3 and 4 could be equally well employed.

The protective helmet of U.S. Pat. No. 4,307,471 does bear some minor resemblance to the structure of the present invention. There, individual projections are formed on either an inner surface, an outer surface, or a member provided between the two to aid in cushioning shock. However, obviously these individual pins cannot provide the resiliency provided by the arcades 3 of the present invention. Neither does the referenced U.S. Patent suggest the use of such arcades. The arcades provided between an inner layer and an outer layer give a unique type of cushioning, not known to the prior art for structures of this type.

In accordance with the present invention a protective layer is formed including an inner layer and an outer layer, with curved, resilient plastic legs being formed between them, the curved, resilient plastic legs being joined into an arcade. Either the inner layer, the outer layer, or both can be provided with a foamed layer in the space provided between the two to aid in cushioning shock. When a force is applied to the outer layer, it is transmitted to the arcade which, through flexing, 20, absorbs a major portion of this shock to prevent its transmittal to the inner layer. If the foamed layers are provided on either the inner surface or outer surface, they too aid in absorbing this shock. When the force is removed, because of the resiliency of the material from which the arcade is formed, the arcade which was affected by the force springs back to its original shape. It is thus ready to aid in dissipating subsequent applications of force. The structure can be employed for helmets of various types, for athletic mats, for body protection devices, and for other devices, including padding dashboards, where impact shock absorption is necessary.

The material of construction of the arcade 3 is not critical. In general, it can be formed of a semi-rigid polyethylene or polypropylene to provide some "spring" effect, but other synthetic plastic materials can also be used, so long as the material employed provides for a springing back of the arcade, upon removal of the force.

Additionally, the various helmet strap supports, and other forms of cushioning can be provided when helmets are formed with a structure of the present invention. Their effect will be, merely, additive to the effect provided by the construction of the present invention.

Though specific embodiments of the invention have been shown and described, the invention should not be considered as limited to these illustrations, but only as limited by the appended claims.

I claim:

1. A shock absorption device including:
   a. a first outer layer;
   b. a second, inner layer, said inner layer being separated from said outer layer so as to provide a space between the two layers; and
   c. a series of curved, flexible legs formed of a resilient plastic material, said legs being joined at the apex of the curvature to form an arcade, said arcade being placed within said space and being free to move within said space.

2. The structure of claim 1 wherein said inner layer and said outer layer are formed from plastic materials.

3. The structure of claim 1 wherein the surface of said outer layer adjacent said space is provided with a foamed surface affixed thereto.

4. The structure of claim 1 wherein the surface of said inner layer adjacent said space is formed with a foamed surface affixed thereto.

5. The structure of claim 1 wherein adjacent arcades abut each other.

6. The structure of claim 1 wherein the legs and spaces of adjacent arcades are interdigitated.

7. The structure of claim 1 incorporated into an athletic helmet.

8. The structure of claim 1 incorporated into an athletic mat.

9. The structure of claim 1 wherein the surface of said inner layer adjacent said space is smooth.

* * * * *